US010541407B2

(12) United States Patent
Jang et al.

(10) Patent No.: US 10,541,407 B2
(45) Date of Patent: Jan. 21, 2020

(54) METHOD OF PRODUCING HIGH PURITY SIOX NANOPARTICLES WITH EXCELLENT VOLATILITY AND APPARATUS FOR PRODUCING THE SAME

(71) Applicant: KOREA INSTITUTE OF ENERGY RESEARCH, Daejeon (KR)

(72) Inventors: Bo-Yun Jang, Daejeon (KR); Jin-Seok Lee, Daejeon (KR); Joon-Soo Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 13/960,288

(22) Filed: Aug. 6, 2013

(65) Prior Publication Data

US 2013/0323594 A1 Dec. 5, 2013

Related U.S. Application Data

(62) Division of application No. 13/267,474, filed on Oct. 6, 2011, now abandoned.

(30) Foreign Application Priority Data

Apr. 1, 2011 (KR) .................. 10-2011-0030414

(51) Int. Cl.
 *H01M 4/04* (2006.01)
 *H01M 4/48* (2010.01)

(52) U.S. Cl.
 CPC ......... *H01M 4/049* (2013.01); *H01M 4/0428* (2013.01); *H01M 4/483* (2013.01); *Y10T 428/2982* (2015.01)

(58) Field of Classification Search
 CPC ..... C30B 29/06; C01B 33/113; C01B 33/181; B01J 3/006; B82Y 30/00; B82Y 40/00;
 (Continued)

(56) References Cited

U.S. PATENT DOCUMENTS 3,594,215 A 7/1971 Wakefield
5,096,685 A * 3/1992 Funahashi .............. B82Y 30/00
 423/325

(Continued)

FOREIGN PATENT DOCUMENTS

EP 0449309 A2 10/1991
JP 2002121323 A 4/2002
(Continued)

OTHER PUBLICATIONS

Japanese Notice of Allowance dated Feb. 7, 2014.

*Primary Examiner* — Hua Qi
(74) *Attorney, Agent, or Firm* — Hauptman Ham, LLP

(57) ABSTRACT

The present disclosure provides a method of producing high purity SiOx nanoparticles with excellent volatility and an apparatus for producing the same, which enables mass production of SiOx nanoparticles by melting silicon through induction heating and injecting gas to a surface of the molten silicon. The apparatus includes a vacuum chamber, a graphite crucible into which raw silicon is charged, the graphite crucible being mounted inside the vacuum chamber, an induction melting part which forms molten silicon by induction heating of the silicon material received in the graphite crucible, a gas injector which injects a gas into the graphite crucible to be brought into direct contact with a surface of the molten silicon, and a collector disposed above the graphite crucible and collecting SiOx vapor produced by reaction between the molten silicon and the injected gas.

7 Claims, 6 Drawing Sheets

(58) Field of Classification Search
CPC . C01P 2004/64; H01M 4/0428; H01M 4/049;
H01M 4/483; Y10T 428/2982
USPC .......................................... 117/200; 427/122
See application file for complete search history.

(56) References Cited

U.S. PATENT DOCUMENTS

| | | |
|---|---|---|
| 5,518,221 A | 5/1996 | Zurecki et al. |
| 6,450,241 B1 | 9/2002 | Lehman |
| 6,759,160 B2* | 7/2004 | Fukuoka ............... C01B 33/113 |
| | | 423/335 |
| 2006/0037733 A1 | 2/2006 | Mon et al. |
| 2006/0166098 A1* | 7/2006 | Tabuchi ................ H01M 4/134 |
| | | 429/232 |
| 2009/0130014 A1* | 5/2009 | Fukuyama et al. ........... 423/349 |
| 2009/0155158 A1* | 6/2009 | Ito et al. ....................... 423/349 |

FOREIGN PATENT DOCUMENTS

| | | |
|---|---|---|
| JP | 2004125246 A | 4/2004 |
| JP | 2009052764 A | 3/2009 |
| KR | 10-2004-0082876 A | 9/2004 |
| KR | 20100124581 A * | 11/2010 |
| WO | 2007063765 A1 | 6/2007 |

* cited by examiner

METHOD OF PRODUCING HIGH PURITY SIOX NANOPARTICLES WITH EXCELLENT VOLATILITY AND APPARATUS FOR PRODUCING THE SAME

CROSS-REFERENCE TO RELATED APPLICATIONS

This Application is a Divisional Application of U.S. Ser. No. 13/267,474 filed Oct. 6, 2011, which also claims the benefit under 35 U.S.A. 119 of Korean Patent Application No. 10-2011-0030414, filed on Apr. 1, 2011 in the Korean Intellectual Property Office, the entirety of which is incorporated herein by reference.

BACKGROUND

1. Technical Field

The present invention relates to a technique for producing high purity SiOx nanoparticles and, more particularly, to a method of producing high purity SiOx nanoparticles with excellent volatility and an apparatus for producing the same, which enables mass production of SiOx nanoparticles by melting a silicon raw material through induction heating and injecting gas to a surface of the molten silicon.

2. Description of the Related Art

Generally, a carbon electrode is used as an anode for lithium ion batteries. Carbon electrodes are advantageous in terms of high charge and discharge efficiency. However, the carbon electrode has limitation in application to an anode for next generation lithium ion batteries on account of a low theoretical capacity of 375 mAh/g.

Although silicon Si used as an anode material for lithium ion batteries has a high theoretical capacity of about 4200 mAh/g, $Li_{4.4}Si$ is formed by reaction between $Li_{4.4}$ and Si during charging of the lithium ion battery, thereby causing high volume expansion up to about 400%. Such high volume expansion induces cracking or short circuit of the anode of the lithium ion battery made of silicon.

On the other hand, although silicon Si is known as undergoing reduction in stress caused by volume expansion when the particle size of silicon varies from a micrometer scale (μm) to a nanoscale (nm), nanoscale silicon particles also provide a problem of cracking or short circuit of the anode due to volume expansion.

BRIEF SUMMARY

One aspect of the present invention is to provide an apparatus for producing SiOx nanoparticles, which melts raw silicon by electromagnetic induction heating using an induction coil and injects various gases onto a surface of molten silicon, thereby enabling mass production of SiOx nanoparticles.

Another aspect of the present invention provides is to provide a method of producing SiOx nanoparticles using the apparatus.

In accordance with one aspect of the present invention, an apparatus for producing SiOx nanoparticles includes a vacuum chamber; a graphite crucible into which raw silicon is charged, the graphite crucible being mounted inside the vacuum chamber; an induction melting part which forms molten silicon by induction heating of the silicon material received in the graphite crucible; a gas injector which injects a gas into the graphite crucible to be brought into direct contact with a surface of the molten silicon; and a collector disposed above the graphite crucible and collecting SiOx vapor produced by reaction between the molten silicon and the injected gas.

In accordance with another aspect of the present invention, a method of producing SiOx nanoparticles includes: charging raw silicon into a graphite crucible; performing induction heating of the raw silicon in the graphite crucible to form molten silicon; injecting a gas into the graphite crucible such that the gas is brought into direct contact with a surface of the molten silicon; and collecting SiOx particles by cooling and condensing SiOx vapor produced by reaction between the molten silicon and the injected gas.

According to embodiments of the invention, the apparatus may produce high purity SiOx nanoparticles having a particle size of about 50 nm or less at low cost in a short time through application of both electromagnetic induction melting and rapid cooling.

In addition, since the SiOx nanoparticles produced by the method according to embodiments of the invention have a high battery capacity of about 1500 mAh/g and may have a particle size of about 50 nm or less, it is expected that the SiOx nanoparticles will increase charge and discharge efficiency to three times or more that of carbon electrodes.

Further, when the SiOx nanoparticles produced by the method according to the embodiments are applied to an anode material for lithium ion batteries, the anode does not suffer from volume expansion and is thus prevented from cracking or short circuit.

Further, when the SiOx nanoparticles produced by the method according to the embodiments are subjected to carbon coating simultaneously with manufacture of SiOx particles, application of the carbon coated SiOx-C particles to an anode material for lithium ion batteries may improve charge and discharge efficiency of the lithium ion batteries based on improvement in electrical conductivity by carbon coating.

BRIEF DESCRIPTION OF THE DRAWINGS

The above and other aspects, features, and advantages of the invention will become apparent from the detailed description of the following embodiments in conjunction with the accompanying drawings.

DETAILED DESCRIPTION

Figure 1:
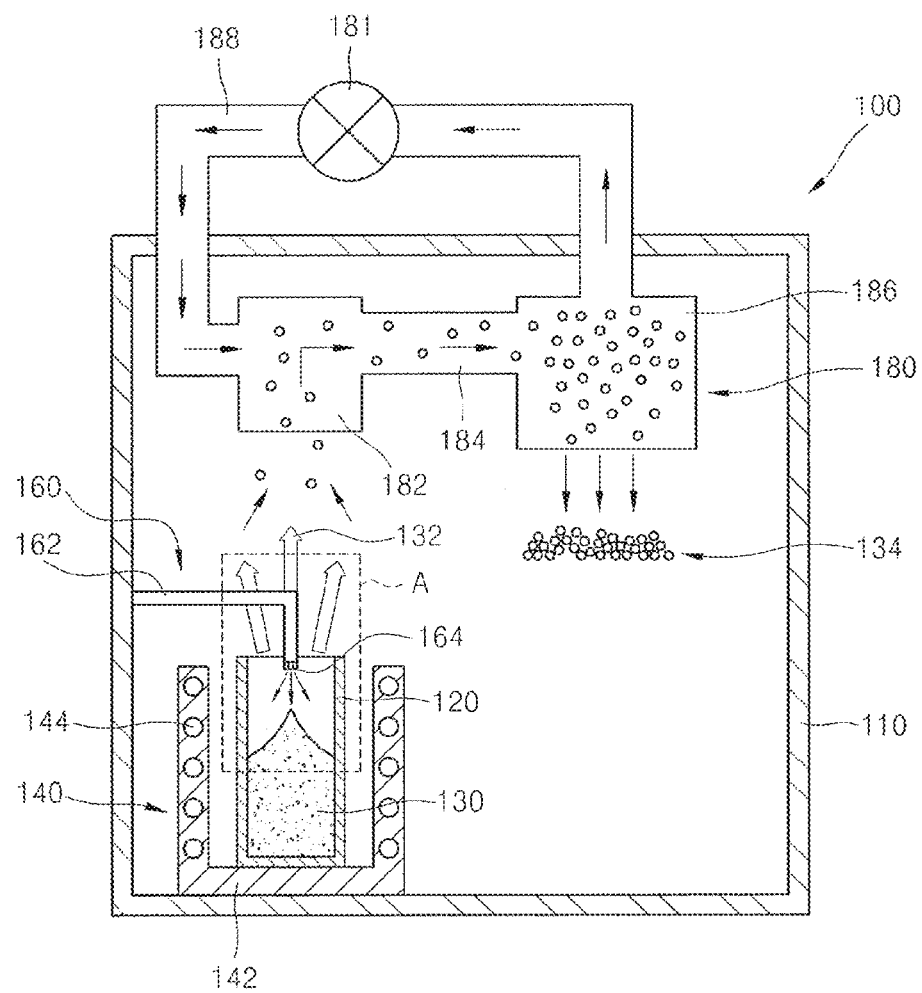
FIG. 1 is a sectional view of an apparatus for producing SiOx nanoparticles according to one exemplary embodiment of the invention.

Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification.

A method of producing high purity SiOx nanoparticles with excellent volatility and an apparatus for producing the same according to exemplary embodiments of the invention will be described with reference to the accompanying drawings.

FIG. 1 is a sectional view of an apparatus for producing SiOx nanoparticles according to one exemplary embodiment of the invention.

Referring to FIG. 1, the SiOx nanoparticles manufacturing apparatus 100 includes a vacuum chamber 110, a graphite crucible 120, an induction melting part 140, a gas injector 160, and a collector 180.

Vacuum Chamber

The vacuum chamber 110 provides a closed space for producing SiOx nanoparticles. It is desirable that the vacuum chamber 110 have a clean interior kept under vacuum.

Graphite Crucible

The graphite crucible 120 is mounted inside the vacuum chamber 110. The graphite crucible 120 is open at an upper side thereof and raw silicon for SiOx nanoparticles is charged into the graphite crucible 120 through the upper side thereof.

Figure 2:
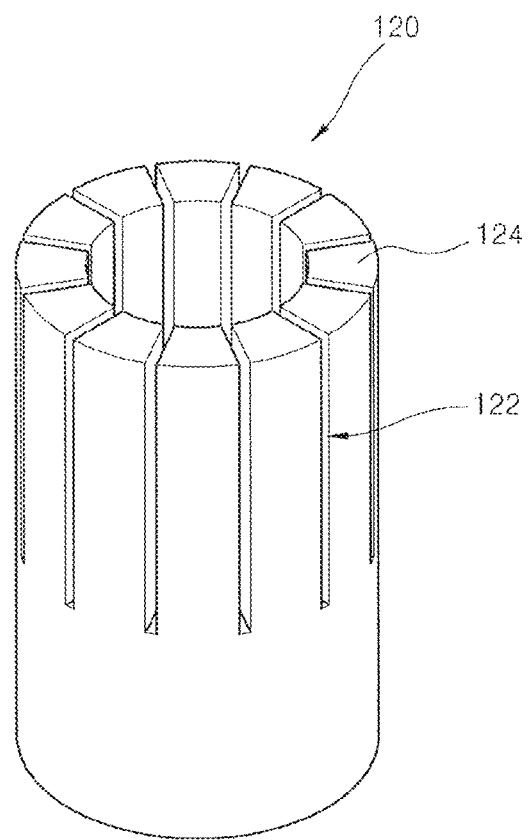
FIG. 2 is a perspective view of a graphite crucible of FIG. 1.
Figure 3:
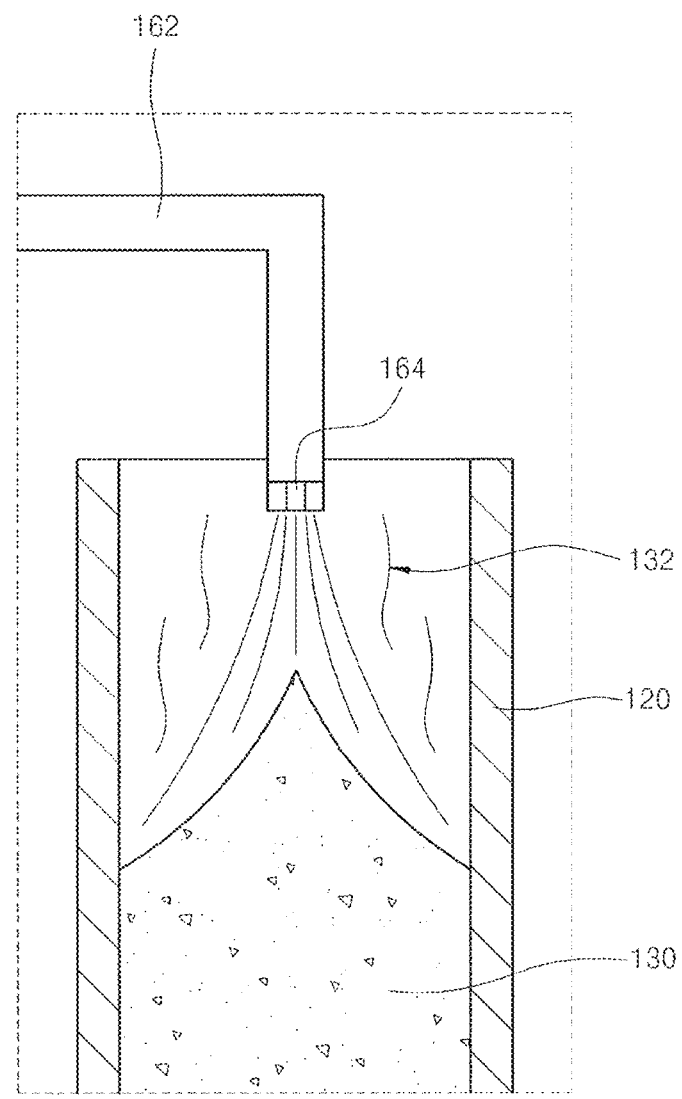
FIG. 3 is an enlarged sectional view of Part A of FIG. 1.

FIG. 2 is a perspective view of the graphite crucible of FIG. 1.

Referring to FIG. 2, the graphite crucible 120 has a cylindrical structure open at the upper side thereof and is provided with a plurality of slits 122, which is formed by cutting part of a wall of the graphite crucible. The graphite crucible 120 is divided into segments 124 by the plurality of slits 122.

In this case, the raw silicon charged into the graphite crucible 120 may be subjected to direct melting by electronic induction heating through the induction melting part 140 (see FIG. 1) described below or subjected to indirect melting by the graphite crucible 120 which is subjected to induction heating through the induction melting part.

Induction Melting Part

Referring again to FIG. 1, the induction melting part 140 may include a refractory crucible 142 and an induction coil 144. The refractory crucible 142 may be configured to enclose the graphite crucible 120. The induction coil 144 is wound around an outer periphery of the graphite crucible 120.

Alternatively, the induction coil 144 may be embedded in a wall of the refractory crucible 142. Although not shown in the drawings, the induction coil 144 may be attached to an inner wall of the refractory crucible 142.

The induction melting part 140 melts the raw silicon received in the graphite crucible 120 through induction heating, thereby forming molten silicon 130.

The induction melting part 140 generates an electromagnetic field directed towards an inner center of the graphite crucible 120. The electromagnetic field generated by induction heating causes the molten silicon 130 to be separated from a sidewall of the graphite crucible 120 and to rise up at the center of the graphite crucible 120. In this way, the molten silicon 130 is stirred by the electromagnetic field, thereby increasing the surface area of the molten silicon 130.

AC current applied to the induction coil 144 of the induction melting part 140 may have a frequency of 10 kHz or less. If the frequency of the AC current applied to the induction coil 144 is lowered to 10 kHz or less, the electromagnetic field may be imparted to a deep portion inside the molten silicon 130, thereby maximizing the flow of the molten silicon. Such flow of the molten silicon maintains the surface of the molten silicon 130 in a more unstable state, thereby improving efficiency of volatilizing the molten silicon 130.

Since silicon has low electrical conductivity up to about 700° C., the raw silicon is initially subjected to indirect heating by heat applied to the graphite crucible 120. Then, when heated to a temperature of 700° C. or more, the silicon rapidly increases in electrical conductivity, thereby allowing electromagnetic induction melting.

In order to produce metallic or non-metallic nanoparticles, various raw metallic or non-metallic materials may be charged into the crucible for electromagnetic induction melting. Examples of raw metal materials include, but are not limited to, Si, Ti, Ag, Al, Au, Cu, Pt, Mg, Zn, Sn, and the like to produce the metallic nanoparticles. Further, various raw non-metallic materials may be used to produce the non-metallic nanoparticles.

Gas Injector

The gas injector 160 injects gas into the graphite crucible 120 to be brought into direct contact with the surface of the molten silicon.

The gas injector 160 includes a gas supply tube 162 to which gas is supplied from the outside, and an injection nozzle 164 coupled to one end of the gas supply tube 162 and disposed inside the graphite crucible 120. Although not shown in the drawings, the gas injector 160 may further include a gas tank (not shown) disposed outside the vacuum chamber 110 to supply gas to the gas supply tube 162.

Here, an injection gas from the gas injector 160, specifically, from the injection nozzle 164 of the gas injector 160, generates SiOx vapor 132 through reaction with the molten silicon 130, and the SiOx vapor 132 flows into the collector 180 disposed above the graphite crucible 120. The injection gas may be injected immediately before the raw silicon melted by injection heating of the induction melting part 140 forms the molten silicon 130.

Examples of the injection gas may include Ar, $H_2$, $O_2$, $H_2O$, and the like. These gases may be used alone or as a mixture of two or more thereof. Among these injection gases, Ar is mixed for the purpose of dilution and $H_2$ is mixed for the purpose of reduction. Further, $N_2$ gas may be mixed to produce nitride-based metal nanoparticles.

The value of "x" in SiOx may be determined according to a partial pressure of the injection gas injected through the gas injector 160. Further, a particle size and shape of the SiOx nanoparticles may be determined according to a flux of the injection gas, and the shape and position of the gas supply tube 162.

Collector

The collector 180 is disposed above the graphite crucible 120 and collects the SiOx vapor 132 produced by reaction between the molten silicon 130 and the injection gas.

The SiOx vapor 132 flowing into the collector 180 is subjected to cooling and condensation, thereby producing SiOx particles 134.

The collector 180 may include a gas phase flow section 182, a collecting section 186, and a gas circulation section 188.

The gas phase flow section 182 is disposed above the graphite crucible 120 to face the graphite crucible 120. As a result, the SiOx vapor 132 produced by induction melting within the graphite crucible 120 flows into the gas phase flow section 182.

The collecting section 186 collects the SiOx particles 134 produced through cooling and condensation of the SiOx vapor 132 having passed through the gas phase flow section 182. When the SiOx vapor 132 flows into the collecting section 186, some of the SiOx vapor 132 is cooled and condensed to produce the SiOx particles 134, and the other flows into the gas circulation section 188 described below.

The collecting section 186 may be provided with a certain structure (not shown) which exhibits a sharp temperature difference in order to facilitate cooling and condensation. Here, the SiOx vapor 132 is transferred by pressure difference created by adjusting pressures of the gas phase flow section 182 and the collecting section 186 to be different from each other.

The gas circulation section 188 circulates the SiOx vapor 132 to allow the SiOx vapor 132, which is not cooled and condensed, to return from the collecting section 186 to the gas phase flow section 182. For this purpose, the gas circulation section 188 may be provided with a circulation pump 181 for circulating the SiOx vapor 132.

On the other hand, the collector 180 may further include a coating gas injection section 184 between the gas phase flow section 182 and the collecting section 186.

The coating gas injection section 184 is provided to perform carbon coating with respect to the SiOx particles 132, which are cooled while flowing into the collecting section 186 through the gas phase flow section 182, and may be eliminated as needed. Although not shown in the drawings, the coating gas injection section 184 may be provided with a coating gas jet nozzle (not shown) through which a coating gas is ejected.

Examples of the coating gas include alkane-based gases, such as $CH_4$, $C_2H_6$, $C_3H_8$, $C_4H_{10}$, $C_5H_{12}$, $C_6H_{14}$ and the like, in addition to Ar or $H_2$. These gases may be used alone or as a mixture of two or more thereof. Among these injection gases, Ar is mixed for the purpose of dilution and $H_2$ is mixed for the purpose of reduction.

The SiOx particles 134 may react with the coating gas, thereby producing SiOx-C particles. In this case, carbon coating may be performed simultaneously with production of the SiOx particles 134.

Therefore, the apparatus according to this embodiment is capable of rapidly producing high purity SiOx nanoparticles having a particle size of about 50 nm or less at low cost through application of both electromagnetic induction melting and rapid cooling.

For this purpose, the apparatus according to this embodiment melts raw silicon by induction heating through electromagnetic induction using an induction coil and injects various gases onto a surface of the molten silicon, thereby enabling mass production of SiOx nanoparticles.

In the apparatus according to this embodiment, the graphite crucible having a plurality of slits is used to melt raw silicon therein through induction heating to maximize the surface area of the molten silicon for increasing volatilization efficiency.

Further, AC current is supplied to the induction coil at a frequency of 10 kHz or less to maintain the surface of the molten silicon in an unstable state by maximizing the flow of the molten silicon, thereby enhancing efficiency of volatizing the molten silicon.

Further, the apparatus according to this embodiment allows carbon coating to be performed simultaneously with production of SiOx particles. When the carbon coated SiOx-C particles are used as an anode material for a lithium ion battery, it is possible to achieve further improvement of charge and discharge efficiency of the lithium ion battery through improvement in electrical conductivity by carbon coating.

Figure 4:
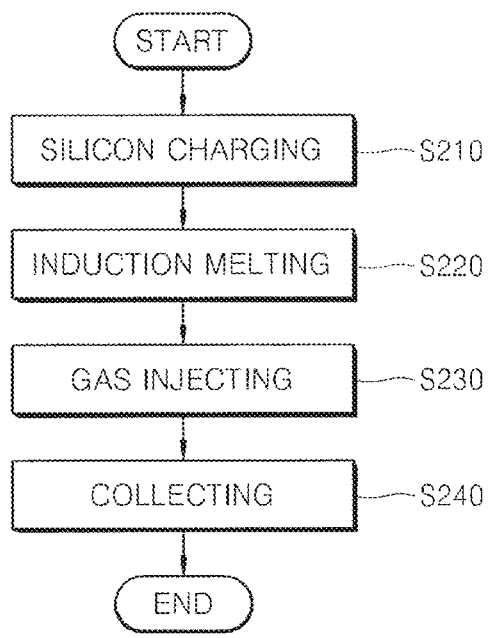
FIG. 4 is a flowchart of a method of producing SiOx nanoparticles according to one exemplary embodiment of the invention.

FIG. 4 is a flowchart of a method of producing SiOx nanoparticles according to one exemplary embodiment of the invention.

Referring to FIG. 4, the SiOx nanoparticle production method includes a silicon charging operation S210, induction melting operation S220, gas injection operation S230, and collecting operation S240.

Silicon Charging

In the silicon charging operation S210, raw silicon is charged into a graphite crucible. The graphite crucible is mounted inside a vacuum chamber. The graphite crucible is open at an upper side thereof and may be divided into segments by a plurality of slits, which are formed by cutting part of a wall of the graphite crucible.

Induction Melting

In the induction melting operation S220, the raw silicon received in the graphite crucible is subjected to induction heating, thereby forming molten silicon.

Here, the electromagnetic field generated by induction heating causes the molten silicon to be separated from a sidewall of the graphite crucible and to rise up at the center of the graphite crucible. In this way, the molten silicon is stirred by the electromagnetic field, thereby increasing the surface area of the molten silicon.

Here, AC current applied to an induction coil surrounding the outer periphery of the graphite crucible may have a frequency of 10 kHz or less.

If the AC current applied to the induction coil is lowered to 10 kHz or less, the electromagnetic field may be imparted to a deep portion inside the molten silicon, thereby maximizing the flow of the molten silicon. Such flow of the molten silicon maintains the surface of the molten silicon in a more unstable state, thereby improving efficiency of volatilizing the molten silicon.

Gas Injecting

In the gas injection operation S230, a gas is injected to be brought into direct contact with the surface of the molten silicon.

Here, the injected gas generates SiOx vapor through reaction with the molten silicon, and the SiOx vapor flows into a collector. The gas may be injected immediately before the raw silicon melted by injection heating forms the molten silicon.

Examples of the injection gas may include Ar, $H_2$, $O_2$, $H_2O$, and the like. These gases may be used alone or as a mixture of two or more thereof. In the gas injection operation, the value of "x" in SiOx may be determined according to a partial pressure of the injection gas. Further, a particle size and shape of the SiOx nanoparticles may be determined according to a flux of the injection gas, and the shape and position of the gas supply tube 162.

Collecting

In the collecting operation S240, SiOx particles are collected by cooling and condensing the SiOx vapor produced by reaction between the molten silicon and the injection gas.

Although not shown in the drawings, the method may further include injecting a coating gas to the SiOx particles to coat the SiOx particles with carbon during the collecting operation S240.

Examples of the coating gas include alkane-based gases such as $CH_4$, $C_2H_6$, $C_3H_8$, $C_4H_{10}$, $C_5H_{12}$, $C_6H_{14}$ and the like, in addition to Ar or $H_2$. These gases may be used alone or as a mixture of two or more thereof.

In this way, the SiOx nanoparticles production method according to this embodiment may be finished.

Since the SiOx nanoparticles produced by the method according to the embodiment have a high battery capacity of about 1500 mAh/g and a particle size of about 50 nm or less, the SiOx nanoparticles may increase charge and discharge efficiency to three times or more that of carbon electrodes.

Further, when the SiOx nanoparticles produced by the method according to the embodiment are applied to an anode material for lithium ion batteries, the anode does not suffer from volume expansion and can thus be prevented from cracking or short circuit.

EXAMPLE

Next, the constitution and functions of the invention will be explained in more detail with reference to the following example. The example is provided for illustrative purposes only and is not to be in any way construed as limiting the invention.

A description of details apparent to those skilled in the art will be omitted.

1. Preparation of SiOx Nanoparticles

First, raw silicon is charged into a crucible. The crucible has an outer diameter of 90 mm, an inner diameter of 60 mm, and a height of 150 mm, and includes 12 slits separated at an interval of 1 mm at 15 degrees from each other.

An induction coil having a diameter of 8 mm was turned 10 times around the crucible from an upper portion of the crucible, and AC current was applied at a frequency of 6.7 kHz to the crucible through the induction coil.

With 250 g of raw silicon charged into the crucible, a vacuum chamber was kept at a vacuum of 5~10 Torr for 1 hour or more and Ar gas was ejected into the chamber to provide an operation vacuum of about 2 Torr.

Applied electric power for melting the raw silicon was in the range of 1~20 kW and was gradually increased by 2 kW every 5 minutes for 50~60 minutes. At an electric power of 16 kW, the raw silicon started melting from the center thereof and molten silicon completely melted the charged raw silicon material while moving from the center of the crucible towards an outer wall thereof.

Immediately after formation of the molten silicon, 0.1~5 vol % of a mixture gas of $O_2$ and Ar was injected towards the surface of the molten silicon to generate SiOx vapor.

It was observed that the SiOx vapor flowed towards a collector disposed above the crucible, and it could be ascertained that yellow particles were accumulated near an inlet of the collector into which the SiOx vapor flowed.

The SiOx vapor was converted into SiOx particles in the collector through cooling and condensation. Here, a reaction gas was injected into a gas circulation section in order to improve yield. In this manner, the SiOx particles were produced through cooling and condensation and collected by a mesh.

As the raw silicon was completely melted, the molten silicon was separated from the sidewall of the crucible and was raised up at the center of the crucible. In this way, it could be ascertained that the molten silicon was stirred and increased in the surface area by the electromagnetic field. Further, it could be ascertained that the vaporized amount was increased with increasing surface area of the molten silicon.

SiOx nanoparticles were produced by injecting an injection gas for 1 hour after completely melting the raw silicon and the electric power was gradually decreased after production of the SiOx nanoparticles to solidify the molten silicon within the crucible. After opening the chamber, the collected SiOx nanoparticles were separated from a mesh.

2. Property Evaluation of SiOx Nanoparticles

Figure 5:
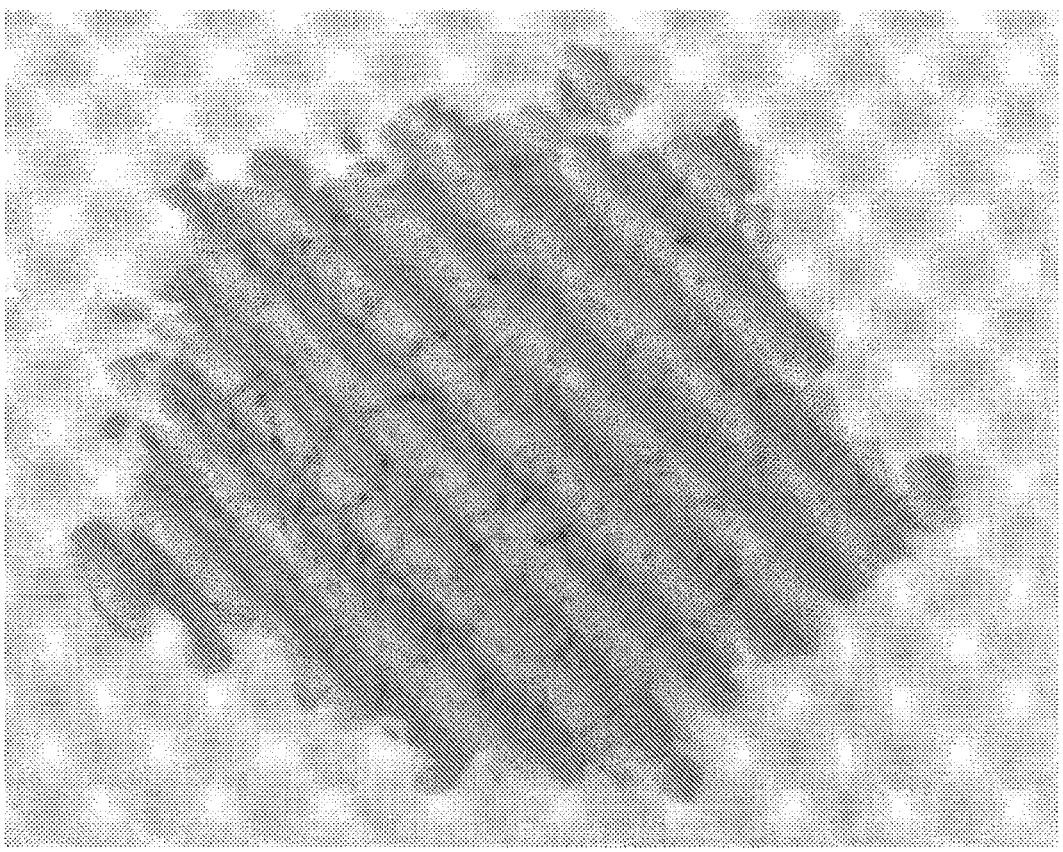
FIG. 5 is a picture of SiOx nanoparticles produced by one example.
Figure 6:
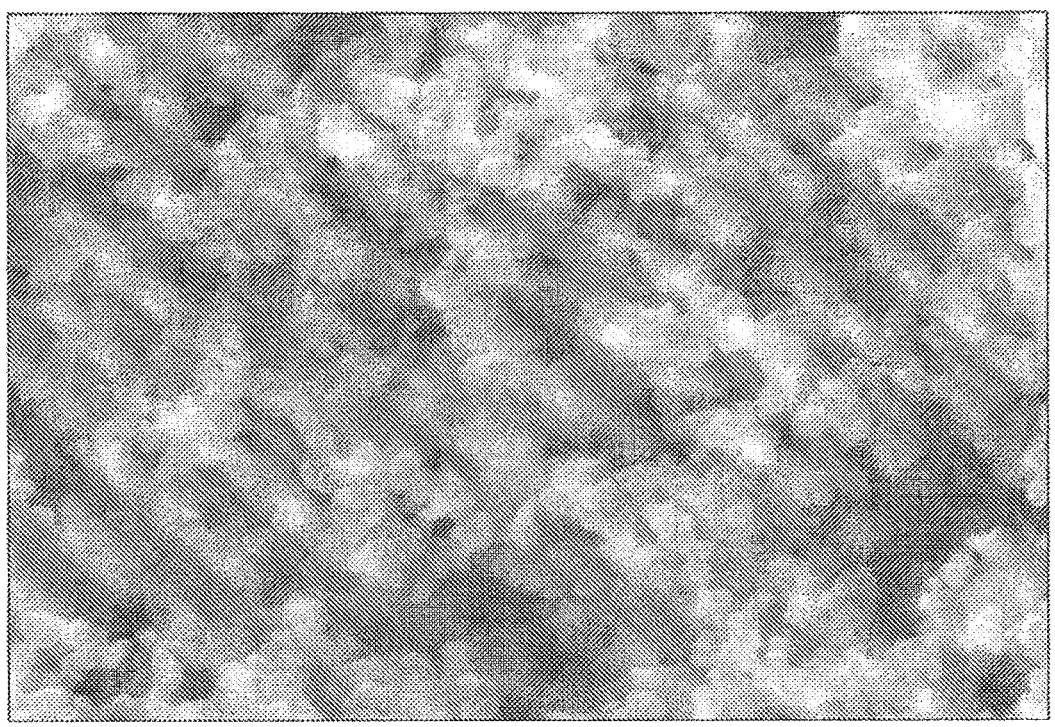
FIG. 6 is a scanning electron micrograph of the SiOx nanoparticles of FIG. 5.

FIG. 5 is a picture of the SiOx nanoparticles produced by the example and FIG. 6 is a scanning electron micrograph of the SiOx nanoparticles of FIG. 5.

As shown in FIGS. 5 and 6, the produced SiOx nanoparticles had a dark yellow color, and it can be seen that the nanoparticles are uniformly distributed. In this example, the SiOx nanoparticles have a particle diameter of 10~50 nm.

As such, the apparatus according to the embodiment may produce high purity SiOx nanoparticles having a particle size of about 50 nm or less at low cost in a short time through application of both electromagnetic induction melting and rapid cooling.

Further, since the SiOx nanoparticles produced by the apparatus according to the embodiment have a high battery capacity of about 1500 mAh/g and a particle size of about 50 nm or less, it is expected that the SiOx nanoparticles will increase charge and discharge efficiency to three times or more that of carbon electrodes.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A method of producing SiOx nanoparticles, comprising:

charging raw silicon into a graphite crucible;

performing induction heating melting of the charged raw silicon in the graphite crucible to form molten silicon having an increased surface area, wherein the molten silicon is stirred by an electromagnetic field and the molten silicon has a portion which is separated from a sidewall of the graphite crucible and risen up at the center of the graphite crucible;

injecting a gas into the graphite crucible via an injection nozzle disposed above the molten silicon, wherein injecting the gas comprises bringing the gas into direct contact with a top surface of the molten silicon;

allowing the molten silicon to react with the injected gas to produce SiOx vapor; and collecting SiOx nanoparticles by cooling and condensing a portion of the SiOx vapor inflowed into a gas phase flow section disposed above the graphite crucible and the injection nozzle, wherein the injected gas comprises $O_2$ and Ar, wherein the graphite crucible is divided into segments by a plurality of slits, wherein the collecting of the SiOx nanoparticles comprises injecting a coating gas to the SiOx nanoparticles, wherein the coating gas is selected from $CH_4$, $C_2H_6$, $C_3H_8$, $C_4H_{10}$, $C_5H_{12}$, $C_6H_{14}$, or a mixture thereof, wherein the SiOx nanoparticles are subjected to carbon coating by the coating gas simultaneously with manufacture of the SiOx nanoparticles, wherein the SiOx vapor is transferred by pressure difference created by adjusting pressures of the gas phase flow section and a collecting section to be different from each other, wherein a gas circulation section circulates the SiOx vapor to allow the SiOx vapor that is not cooled and condensed to return from the collecting section to the gas phase flow section.

2. The method of claim 1, wherein the induction heating is performed by applying an AC current having a frequency of 10 kHz or less to an induction coil.

3. SiOx nanoparticles for an anode material of a lithium ion battery produced by the method according to claim 1.

4. The SiOx nanoparticles of claim 3, wherein the nanoparticles have a particle size of 10 nanometers (nm) to 50 nm.

5. The method of claim 1, wherein the injecting of the gas into the graphite crucible includes injecting the gas comprising 02 into the graphite crucible below a top of the sidewall of the graphite crucible.

6. The method of claim 1, further comprises circulating the SiOx vapor inside and outside of a vacuum chamber covering the graphite crucible and the injection nozzle, through the gas circulation section which is partially covered by the vacuum chamber.

7. A method of producing SiOx nanoparticles, comprising:

charging raw silicon into a graphite crucible, wherein the graphite crucible is divided into segments by a plurality of slits;

performing induction heating melting of the charged raw silicon to form molten silicon;

stirring the molten silicon by an electromagnetic field;

injecting a gas comprising oxygen ($O_2$) and argon (Ar) into the graphite crucible via an injection nozzle above the molten silicon to a top surface of the molten silicon;

reacting the molten silicon with the $O_2$ to produce a SiOx vapor;

cooling and condensing the SiOx vapor to form SiOx nanoparticles, comprising:

cooling and condensing a portion of the SiOx vapor to SiOx nanoparticles;

injecting a coating gas comprising $CH_4$, $C_2H_6$, $C_3H_8$, $C_4H_{10}$, $C_5H_{12}$, $C_6H_{14}$, or a mixture thereof to coat the SiOx nanoparticles with carbon; and recirculating the SiOx vapor not cooled and condensed for cooling and condensation; and collecting the SiOx nanoparticles.

* * * * *